Dec. 16, 1930.  J. B. WHIPPLE  1,785,021
FRUIT PITTER
Filed March 4, 1926  2 Sheets-Sheet 1
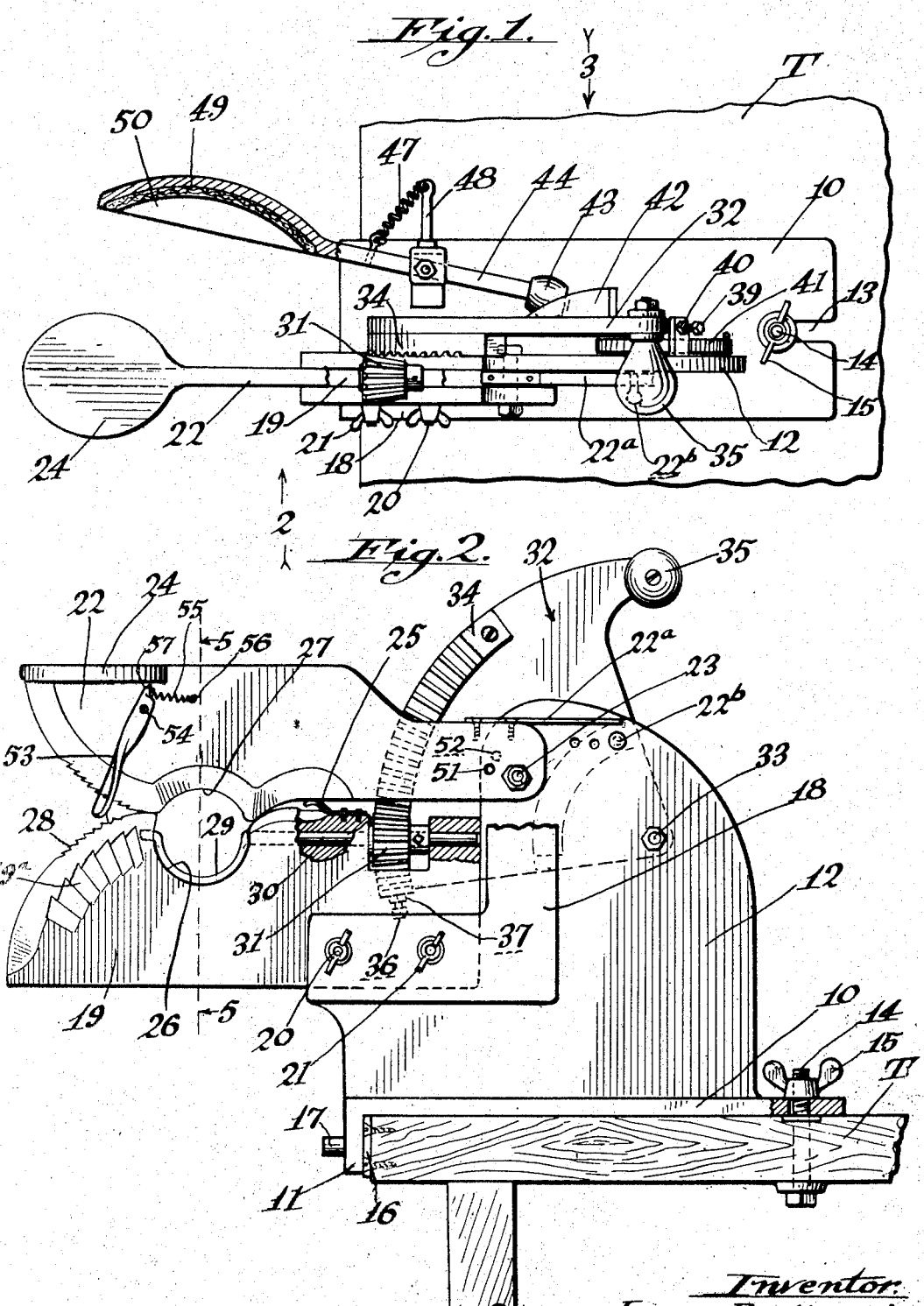
Inventor
James B. Whipple
by Hazard and Miller
Attorneys Dec. 16, 1930. J. B. WHIPPLE 1,785,021
FRUIT PITTER
Filed March 4, 1926 2 Sheets-Sheet 2
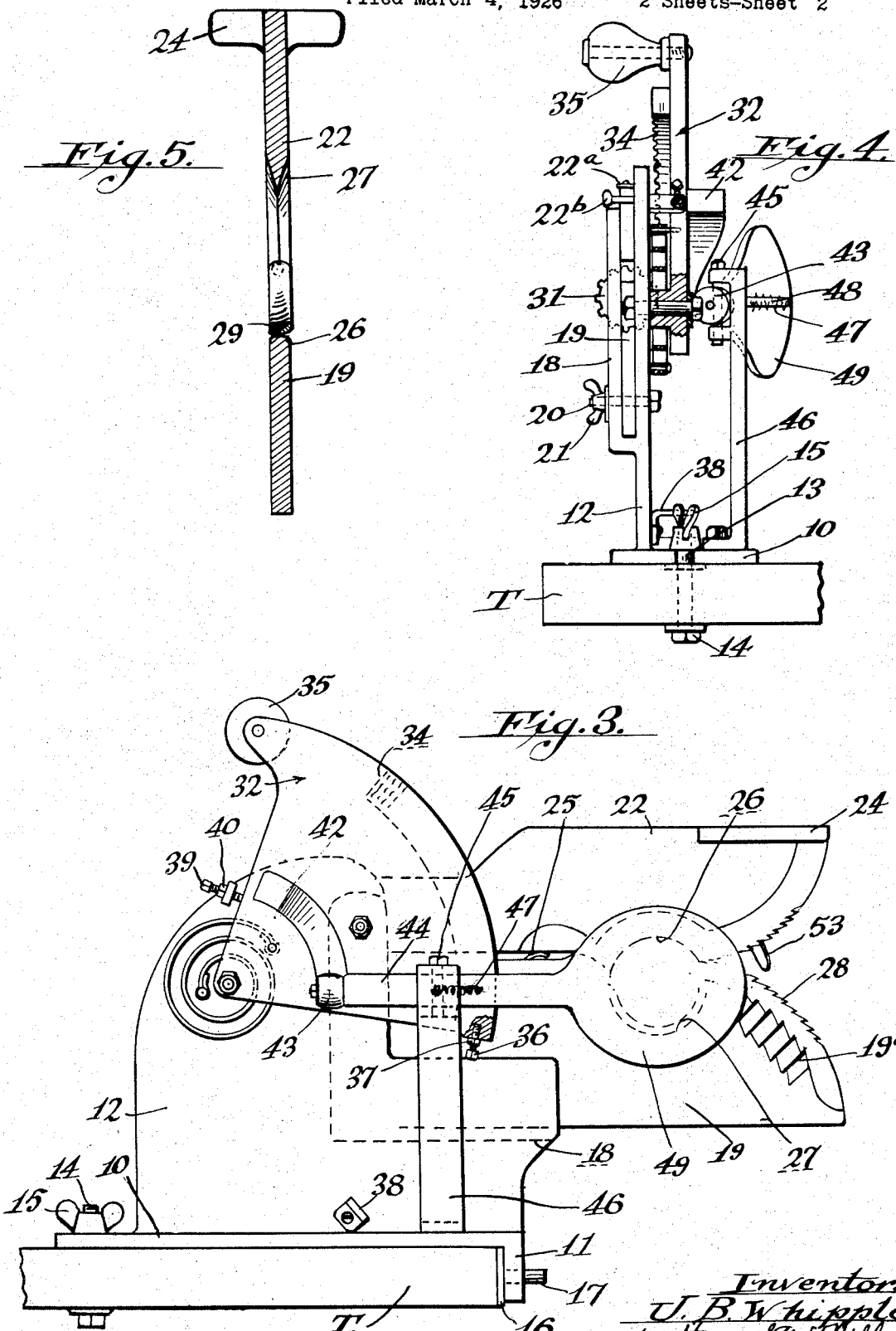

Patented Dec. 16, 1930

1,785,021

UNITED STATES PATENT OFFICE

JAMES B. WHIPPLE, OF HUNTINGTON PARK, CALIFORNIA, ASSIGNOR, BY MESNE ASSIGNMENTS TO PACIFIC MACHINERY COMPANY, OF SAN FRANCISCO, CALIFORNIA, A CORPORATION OF CALIFORNIA

FRUIT PITTER

Application filed March 4, 1926. Serial No. 92,303.

This invention relates to improvements in fruit pitters.

An object of the invention is to provide an improved fruit pitter which is of cheap, simple and durable construction and which will enable the pits to be removed from fruit very efficiently.

A further object of the invention is to provide a fruit pitter which can be employed either for removing the pits from the cling pit varieties of fruit and also for the free pit varieties of fruit.

With the foregoing and other objects in view which will be made manifest in the following detailed description and specifically pointed out in the appended claims, reference is had to the accompanying drawings for an illustrative embodiment of the invention, wherein:

Figure 1 is a top plan view of the improved fruit pitter,

Fig. 2 is a side elevation taken in the direction of the arrow 2 upon Fig. 1,

Fig. 3 is a side elevation taken in the direction of the arrow 3 upon Fig. 1,

Fig. 4 is a rear view in elevation, parts being broken away and shown in section, illustrating the fruit pitter, and Fig. 5 is a vertical section taken on the line 5—5 upon Fig. 2.

Referring to the accompanying drawings wherein similar reference characters designate similar parts throughout, the improved fruit pitter is designed to be mounted upon a table or other suitable support. It consists of a frame having a base 10 which has a downwardly extending flange 11 and an upright 12. At the rear of the base 10 there is provided a slot 13 adapted to receive a bolt 14 passing through the table top T and which is tightened by a wing nut 15. On the forward edge of the table top T there may be secured a bracket 16 having one or more pins 17 extending through the flange 11. In this manner the bolt 14 together with the wing nut 15 and also the pin 17 serve to rigidly mount the frame upon the table top.

Adjacent the upright 12 there is provided an angular plate 18 and between this plate and the upright 12 there is positioned a stationary blade 19 removably held in place by means of bolts 20 having wing nuts 21. In a similar manner a movable blade 22 is pivotally mounted between the plate 18 and the upright 12, as upon a bolt 23. The upward swinging movement of the pivoted blade 22 is limited by means of a stop 22a engageable upon a stop pin 22b so that oversized fruit cannot be forced between the two blades. The swinging movement of the blade 22 may have its limit adjusted by positioning the stop pin 22b in any one of the apertures shown upon the upright 12. On the top of the movable blade 22 there is provided a handle 24 which can be used in forcing the movable blade 22 into contact with the stationary blade 19 against the action of a leaf spring 25 mounted on the stationary blade and urging the movable blade into spaced relation with respect to the stationary blade. Complementary recesses 26 and 27 are formed in the two blades which are adapted to cooperate to receive the pit of the fruit. The forward edges of the two blades are preferably arcuate and diverge from each other, as indicated at 28. The forward edge of the lower blade 19 is preferably toothed, as clearly shown upon Fig. 2, and upon the sides of the blades there are also formed teeth, such as are indicated at 19a. Positioned in the recess 26 is an arcuate knife 29 which is mounted for rotation so that it can be caused to swing through the recess 27 in cutting the pulp of the fruit around the pit. This arcuate knife is rotatable about an axis approximately parallel to the meeting edges of the two blades 19 and 22. A shank 30 is secured to one end of the arcuate knife 29 and is rotatably mounted in the blade 19, and a pinion 31 is keyed to this shank.

A quadrant 32 is pivotally mounted upon the upright 12 as upon a bolt 33, and this quadrant carries an arcuate rack 34, meshing with the pinion 31. It is also provided with a handle 35 and carries an adjustable screw 36. The adjustable screw 36 is locked in adjusted position as by a lock nut 37 and is adapted to engage a stop 38 which limits the downward movement of the quadrant. The upward movement of the quadrant is limited by a screw 39 locked in adjusted position by a lock nut 40 and which is mounted upon the upright 12. A spring, such as the spiral spring 41, serves to urge the quadrant 32 into its uppermost position. On the quadrant there is provided a cam 42 which is engaged by a roller 43 on a flexible arm 44. The flexible arm 44 is pivotally mounted, as at 45, upon a standard 46 mounted upon the base 10. This arm is urged into that position in which the roller 43 engages the cam 42 by a spring 47 which connects the arm to a bracket 48 on the standard. The flexible or resilient arm 44, which may be formed of spring steel, carries on its outer end a hand or concaved cup 49 which is preferably provided with a felt pad 50. This hand is adapted to be swung into a position adjacent the sides of the blades 19 and 22 opposite the recesses 26 and 27.

The operation of the above described construction is as follows: The fruit, which may be, for example, a cling stone peach, is forced between the divergent cutting edges 28 on the two blades 19 and 22, such forcing movement lifting the movable blade 22 and causing its sharpened edge to cut the upper side of the peach. The lower side of the peach is also cut and this cut is made quite wide by the teeth 19a on the blade 19, so that this cut on the lower side can receive the arcuate knife 29. When the fruit has been forced sufficiently between the blades, the pit will be received in the recesses 26 and 27 and the handle 24 is then struck, causing the blades to engage each other on both sides of the recesses and complete the circumferential cut of the pulp around the pit. As soon as the upper blade is released, however, it is raised slightly by the spring 25, causing the blades to slightly clear the pit. After this has been done, the handle 35 is grasped and pulled forwardly and downwardly against the action of the spring 41. This causes the rack 34 to rotate the pinion 31, rotating the shank 30 and swinging the knife 29 outwardly from the obverse side of the blade 19, as shown in Fig. 2. The arcuate knife 29 cuts the pulp away from the pit from one half of the peach until it assumes a position in the plane of the blade 22 and within the recess 27. When this half of the peach is cut away from the pit, it immediately drops off and falls into a receiving receptacle. During the continued movement of the quadrant 32, the arcuate knife 29 swings out of the recess 27 from the reverse side of the plane 22, as illustrated in Fig. 2, so as to cut the other half of the peach away from the pit. Before this cut takes place, however, it will be noted that the downward swinging of the quadrant 32 causes the cam 42 to swing the resilient arm 44 against the action of the spring 47. This causes the hand 49 to be positioned against the remaining half of the peach while this half is being cut away from the pit. On the release of the handle 35 the coil spring 41 lifts the quadrant 32 into its initial position, reversely rotating the shank 30 and the knife 29, and permitting the hand 49 to disengage the half of the peach which was held during the completion of the cut. This half of the peach therefore drops into the receiving receptacle and during the reverse rotation or spinning of the arcuate knife 29, it will be found that this knife will strike the pit and throw it or kick it out laterally a considerable distance from within the recesses 26 and 27. In this manner it will be appreciated that the improved fruit pitter greatly simplifies the handling and pitting of the fruit and permits large quantities to be handled very quickly.

The improved fruit pitter can be easily converted from a machine for handling fruits of the cling pit varieties to a machine for handling fruits of the free pit varieties, such as free stone peaches. In order to accomplish this, a hole 51 is formed in the upright 12 and a corresponding hole 52 is formed in the blade 22. Upon lifting the blade 22, these holes can be caused to register, and a pin can be inserted therethrough so as to lock the blade 22 in elevated position. A finger 53 may be mounted upon the blade 22 for swinging movement by inserting a bolt 54 therethrough. The finger 53 carries a spring 55 which is adapted to have its free end connected to a pin 56 on the movable blade 22. In removing the pit from free stone peaches, the peach is forced between the two edges 28 in a similar manner to that previously described, that is, by rotating it while it is being so forced to cause the circumferential cut to be made. In such instances on tending to force the peach between the blades, after the upper blade is locked, the pit will wedge itself between the two edges 28 on the two blades, permitting the two halves of the peach to be removed from the pit laterally and dropped into the receiving receptacle. On forcing the peach between the two blades, however, the finger 53 is forced rearwardly, stretching the spring 55 and when the two halves of the peach are removed from the sides of the pit, this finger will be snapped forwardly by the spring 55, kicking out the pit which was wedged between the two blades. The forward movement of the finger is limited by a stop or pin 57.

From the above described construction it will be readily appreciated that this machine can be used for fruits either of the free pit or the cling pit variety, and is very efficient in use.

It will be understood that various changes may be made in the detail of construction without departing from the spirit or scope of the invention as defined by the appended claims.

I claim:

1. A fruit pitter comprising two opposed blades having complementary recesses adapted to cooperate to receive the pit of the fruit, an arcuate knife disposed in one of said recesses, said knife being rotatable upon an axis parallel to the meeting edges of said blades so as to swing into the other recess, and means for rotating said knife.

2. A fruit pitter comprising two opposed, pivotally connected blades, said blades having complementary recesses adapted to cooperate to receive the pit of the fruit, spring means urging said blades into a slightly spaced relation but permitting them to be forced into contact with each other, an arcuate knife disposed in one of said recesses and rotatable about an axis parallel to the edges of the blades, and means for rotating said knife so as to cause it to swing through the other recess.

3. A fruit pitter comprising two opposed, pivotally connected blades, said blades having complementary recesses adapted to cooperate to receive the pit of the fruit, spring means urging said blades into a slightly spaced relation but permitting them to be forced into contact with each other, an arcuate knife disposed in one of said recesses and rotatable about an axis parallel to the edges of the blades, and means for rotating said knife so as to cause it to swing through the other recess comprising a shank secured to one end of the knife and rotatably mounted in one of said blades, a pinion mounted on the shank and a pivoted member carrying an arcuate rack meshing with said pinion.

4. A fruit pitter comprising a frame, a blade stationarily mounted thereon, a second blade pivotally mounted thereon, said blades having complementary recesses formed therein adapted to receive the pit of the fruit, an arcuate knife disposed in one of said recesses adapted to swing through the other recess upon rotation, a shank secured to the knife and rotatably mounted upon the stationary blade, a pinion secured to the shank, a quadrant pivoted upon said frame having an arcuate rack meshing with said pinion, a handle on the quadrant, and spring means urging the quadrant into a predetermined position.

5. A fruit pitter comprising a frame, a blade stationarily mounted thereon, a second blade pivotally mounted thereon, said blades having complementary recesses formed therein adapted to receive the pit of the fruit, an arcuate knife disposed in one of said recesses adapted to swing through the other recess upon rotation, a shank secured to the knife and rotataby mounted upon the stationary blade, a pinion secured to the shank, a quadrant pivoted upon said frame having an arcuate rack meshing with said pinion, a handle on the quadrant, spring means urging the quadrant into a predetermined position, an arm pivoted upon the frame, a cam on the quadrant engaged by the arm, spring means urging the arm into position engaging the cam, and a hand on the arm adapted to be swung thereby into a position adjacent the sides of said blades opposite said recesses.

6. A fruit pitter comprising two opposed blades pivotally connected to each other, there being complementary recesses formed in said blades adapted to cooperate to receive the pit, an arcuate knife disposed in one recess, means for rotating said knife so as to swing it from one recess into the other, the knife swinging outwardly upon one side of the blades, and a hand adapted to be positioned adjacent the opposite sides of the blades, and means for causing the hand to be so positioned when the knife is being moved from the mentioned other recess upon the hand side of the blades to the first recess.

7. A fruit pitter comprising two opposed blades pivotally connected to each other, there being complementary recesses formed in the blades adapted to cooperate to receive the pit, the forward edges of the blades being divergent, so that fruit may be forced therebetween, lifting the upper blade and causing the blades to slit the fruit about the pit, and means for cutting the fruit about the pit.

8. A fruit pitter comprising two opposed blades pivotally connected to each other, there being complementary recesses formed in the blades adapted to cooperate to receive the pit, the forward edges of the blades being divergent, so that fruit may be forced therebetween, lifting the upper blade and causing the blades to slit the fruit about the pit, and an arcuate knife mounted for rotation upon one of said blades adapted to cut the pulp of the fruit from around the pit.

9. A fruit pitter comprising impaling means adapted to cleave the flesh of the fruit down to the pit, an arcuate knife for cutting the flesh of the fruit away from the pit, means for operating said arcuate knife, and means for reversely operating the knife to cause the knife to remove the pit from the impaling means when the flesh of the fruit has been detached from the pit.

In testimony whereof I have signed my name to this specification.

JAMES B. WHIPPLE.